United States Patent
Bollandoor et al.

(10) Patent No.: US 9,471,231 B2
(45) Date of Patent: Oct. 18, 2016

(54) SYSTEMS AND METHODS FOR DYNAMIC MEMORY ALLOCATION OF FAULT RESISTANT MEMORY (FRM)

(71) Applicants: Jagadeesha Bollandoor, Bangalore (IN); Kiran Kumar Devarapalli, Bangalore (IN); Krishnaprasad Koladi, Bangalore (IN); Robert J. Volentine, Round Rock, TX (US)

(72) Inventors: Jagadeesha Bollandoor, Bangalore (IN); Kiran Kumar Devarapalli, Bangalore (IN); Krishnaprasad Koladi, Bangalore (IN); Robert J. Volentine, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 14/218,393

(22) Filed: Mar. 18, 2014

(65) Prior Publication Data

US 2015/0268874 A1   Sep. 24, 2015

(51) Int. Cl.
| | |
|---|---|
| G06F 15/177 | (2006.01) |
| G06F 3/06 | (2006.01) |
| G06F 9/44 | (2006.01) |
| G06F 9/455 | (2006.01) |

(52) U.S. Cl.
CPC .............. *G06F 3/0619* (2013.01); *G06F 3/065* (2013.01); *G06F 3/0632* (2013.01); *G06F 3/0665* (2013.01); *G06F 3/0679* (2013.01); *G06F 9/4406* (2013.01); *G06F 9/45558* (2013.01); *G06F 2009/45583* (2013.01); *G06F 2206/1014* (2013.01)

(58) Field of Classification Search
CPC ............................ G06F 9/4401; G06F 9/5016
See application file for complete search history.

(56) References Cited

U.S. PATENT DOCUMENTS

| | | | |
|---|---|---|---|
| 7,921,266 B2 | 4/2011 | Rangarajan et al. | |
| 8,001,581 B2 | 8/2011 | Ford et al. | |
| 8,151,138 B2 | 4/2012 | Khatri et al. | |
| 2009/0216985 A1* | 8/2009 | O'Connor | G06F 11/1076 711/170 |
| 2010/0146267 A1 | 6/2010 | Konetski et al. | |

OTHER PUBLICATIONS

Lenovo, Lenovo Thinkserver Memory RAS Technologies, Printed From Internet Feb. 10, 2014, 2 pgs.
Zhang et al., "Systems and Methods for Intelligent System Profile Unique Data Management", DELL:152, U.S. Appl. No. 13/618,666, filed Sep. 14, 2012, 32 pgs.
Shetty et al.; Systems and Methods for Infrastructure Template Provisioning in Modular Chassis Systems, DELL:166, U.S. Appl. No. 13/955,423, filed Jul. 31, 2013, 34 pgs.
DELL, "Memory for Dell PowerEdge $12^{th}$ Generation Servers", Feb. 2012, 16 pgs.

* cited by examiner

*Primary Examiner* — Kim Huynh
*Assistant Examiner* — Eric Chang
(74) *Attorney, Agent, or Firm* — Egan, Peterman, Enders & Huston LLP

(57) ABSTRACT

Systems and methods are provided that may be employed to dynamically and intelligently allocate fault resistant memory (FRM) by calculating the currently required size of a protected reliable memory region for the FRM on an as-needed basis, rather than on a static basis. In one example, an operating system, or hypervisor or other virtualization layer may be employed to calculate the required size for the protected reliable memory region of the FRM based on current memory requirements of the virtualization layer kernel and running instances of other critical processes, and then to interact in real time with the system BIOS to cause an adjustment in the reserved protected reliable memory region.

26 Claims, 5 Drawing Sheets

SYSTEMS AND METHODS FOR DYNAMIC MEMORY ALLOCATION OF FAULT RESISTANT MEMORY (FRM)

FIELD OF THE INVENTION

This invention relates generally to information handling systems and, more particularly, to memory allocation of fault resistant memory (FRM).

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system memory has been mirrored in the past to provide redundant memory for recovery from memory errors. Fault Resilient Memory (FRM) is a type of reserved redundant memory that has been employed in combination with a hypervisor (such as VMware ESXi 5.5 available from VMware, Inc. of Palo Alto, Calif.) that is executing on an information handling system server (such as a Dell PowerEdge 12G server available from Dell Products L.P. of Round Rock, Tex.) to mirror memory channels in Socket 0 so as to introduce fault tolerance and memory reliability. In such applications, FRM is employed in this manner so that the underlying OS/hypervisor can continue running the OS kernel and other critical processes even when an uncorrectable error occurs to the memory that it utilizes. The FRM mirrored portion of the total system memory may also be referred to as the protected reliable memory region.

A conventional FRM protected reliable memory region is statically assigned to be one-fourth of the total system active primary memory. This static calculation is performed by system BIOS when the information handling system boots up with a FRM memory BIOS token set to enable. When the FRM memory region is not fully utilized by the underlying hypervisor or Operating System, system primary memory is wasted. This waste of system primary memory can also adversely affect the performance of virtual machines (workloads) running on the hypervisor when the non-FRM total system memory requirement for these workloads exceeds the non-mirrored portion of the primary memory. As an example, assuming a server has a total system primary memory of 768 GB (each of 24 DIMM slots filled with 32 GB DIMM modules), 192 GB (one-fourth of 768 GB) is conventionally allocated for the protected reliable memory region by the system when the FRM memory BIOS token is enabled. However, in the case of VMware ESXi 5.5, the vmkernel and other default critical processes may not require the entire reserved protected reliable memory region of 192 GB. In such a situation, the remainder of the unused reserved primary memory ranges that are statically assigned by the system BIOS to the protected reliable memory region are wasted.

SUMMARY OF THE INVENTION

Disclosed herein are systems and methods that may be employed to dynamically and intelligently allocate fault resistant memory (FRM) by calculating the currently required size of a protected reliable memory region for the FRM on an as-needed basis, rather than on a static basis. In one exemplary embodiment, the disclosed systems and methods may be implemented on an information handling system, such as a server, that includes a processing device that is executing an operating system (OS), or a hypervisor or other type of virtualization layer that is running multiple virtual machines (VMs). In such an embodiment, the virtualization layer or OS may be employed to calculate the required size for the protected reliable memory region of the FRM based on current memory requirements of the virtualization layer kernel (e.g. OS kernel or hypervisor kernel) and running instances of other critical processes, and then to interact in real time with the system BIOS to cause an adjustment in the reserved protected reliable memory region. For example, the virtualization layer or OS may calculate the memory required for each given current running instance, and provide memory adjustment information (e.g., such as a memory adjustment request or a memory adjustment command) to system BIOS using available Advanced Configuration and Power Interface (ACPI) specification methods (e.g., such as by modifying an ACPI table in non-volatile memory) or other suitable communication interface technique such as software system management interrupt. The system BIOS may react to receipt of the memory adjustment information by increasing or decreasing the size of the reserved protected reliable memory region.

In one exemplary embodiment, when FRM is enabled (e.g., via enabling an appropriate token), system BIOS may initially set (or reserve) a default protected range portion of the total system memory for use as a FRM protected reliable memory region. Once an operating system (OS) or virtualization layer is booted for an operating session, it may read the default FRM protected reliable memory region (e.g., from an ACPI table) and then start running virtualization layer kernel (e.g., vmkernel) and selected critical processes in that specified default FRM protected reliable memory region during the booted operating session. Thereafter, the virtualization layer or OS may calculate the actual size of the memory region that is required to run the OS kernel or virtualization layer kernel and selected critical processes. If the virtualization layer or OS determines that the default range provided for FRM protected reliable memory region provided is larger than what is required to run the OS kernel or virtualization layer kernel and selected critical processes, then the virtualization layer may notify the system BIOS to release a selected portion of the excess FRM protected reliable memory region memory space for regular memory use instead of FRM protected reliable memory region usage.

For example, the virtualization layer or OS may calculate or otherwise determine a desired protected reliable memory region range having a desired memory size (e.g., optionally including an additional excess amount of memory space as a buffer to ensure sufficient memory will exist), and then send the data or information specifying this desired size as a requested protected reliable memory size value to the system BIOS (or otherwise make this data or information available to the system BIOS). This notification to the system BIOS may be performed, for example, by using ACPI methods defined in an ACPI specification such as ACPI Specification revision 5.0 (e.g., by using the virtualization layer or OS to modify an ACPI table in non-volatile memory by writing the desired memory size to the ACPI table that may then be accessed and read by the system BIOS). In one exemplary embodiment, the system BIOS may modify the system memory ranges to meet the requested protected reliable memory size value requirement and modify the ACPI FRM table with the updated memory range during memory initialization at the next system cold or warm reboot for use in a subsequent operating session. In another exemplary embodiment, system BIOS may modify the system memory ranges to meet the requested protected reliable memory size value requirement in real time during the same operating session, and without rebooting.

In one respect, disclosed herein is an information handling system, including: volatile system memory, the volatile system memory having a total available memory space; and at least one host processing device coupled to access the total memory space of the volatile system memory, the processing device being configured to execute a system basic input/output system (BIOS) to allocate a variable portion of the total memory space of the volatile system memory as a protected reliable memory region to mirror one or more other portions of the total memory space, and to execute a virtualization layer or operating system (OS) from the mirrored portions of the protected reliable memory region. The processing device may be further configured to: execute the virtualization layer or OS to determine a size of protected reliable memory region based at least in part on a value of actual memory size required to execute at least the virtualization layer or OS, and to provide the determined size of protected reliable protected memory as a requested protected reliable memory size value to the system BIOS; and to execute the system BIOS to set the size of the protected reliable memory region to equal the requested protected reliable memory size value received from the virtualization layer or OS.

In another respect, disclosed herein is a method of allocating fault resistant memory within a total available volatile memory space that is coupled to at least one host processing device of an information handling system. The method may include using the at least one host processing device to: implement a system basic input/output system (BIOS) to access and allocate a variable portion of the total memory space of the volatile system memory as a protected reliable memory region to mirror one or more other portions of the total memory space; implement a virtualization layer or operating system (OS) from the mirrored portions of the protected reliable memory region; cause the virtualization layer or OS to determine a size of protected reliable memory region based at least in part on a value of actual memory size required to implement the at least the virtualization layer or OS, and to provide the determined size of protected reliable protected memory as a requested protected reliable memory size value to the system BIOS; and cause the system BIOS to set the size of the protected reliable memory region to equal the requested protected reliable memory size value received from the virtualization layer or OS.

DESCRIPTION OF ILLUSTRATIVE EMBODIMENTS

Figure 1:
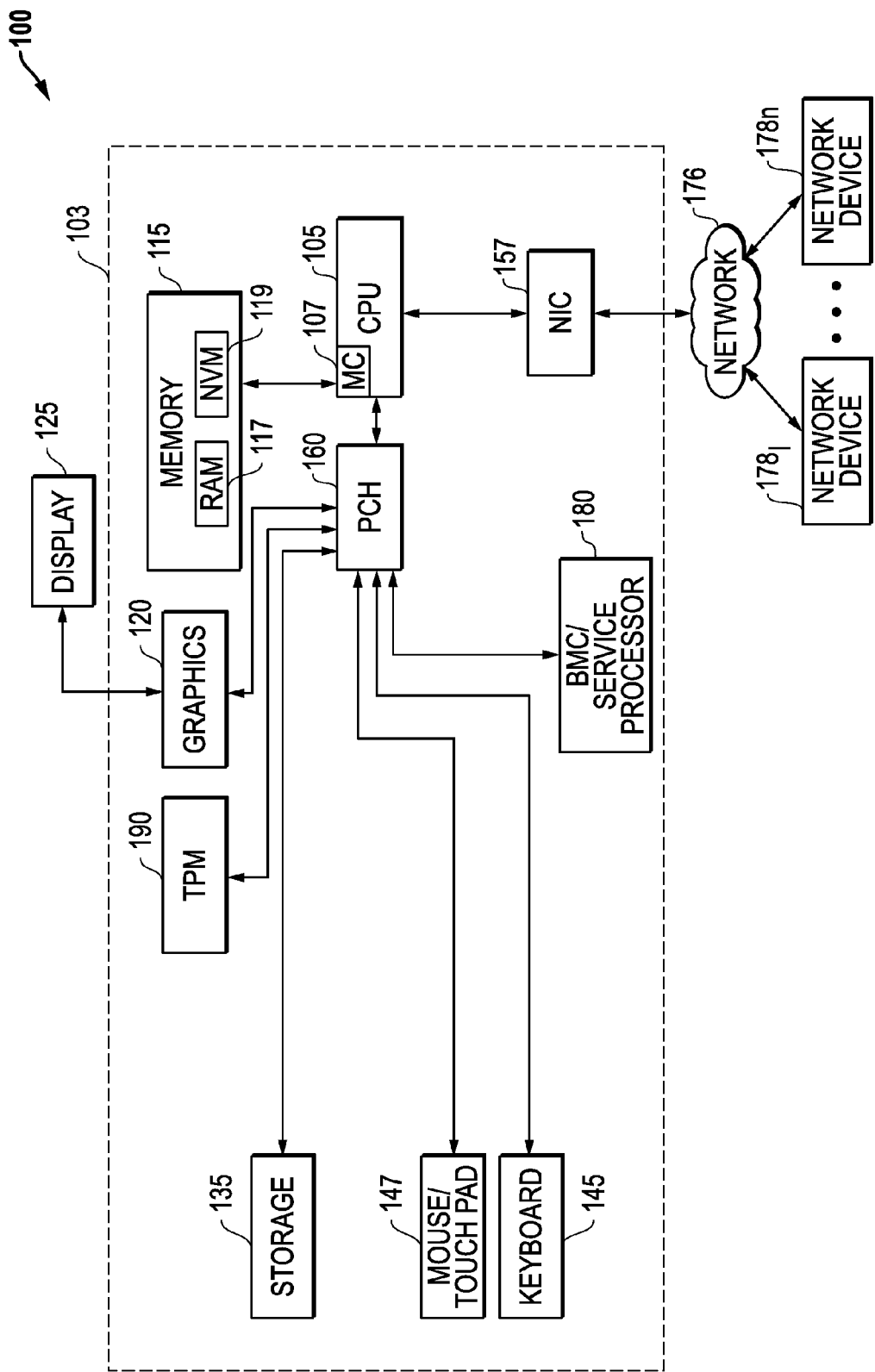
FIG. 1 is a simplified block diagram of an information handling system according to one exemplary embodiment of the disclosed systems and methods.

FIG. 1 is a block diagram of an information handling system 100 as it may be configured as a computer server system according to one exemplary embodiment of the disclosed systems. In this regard, it will be understood that the server configuration of FIG. 1 is exemplary only, and that the disclosed systems and methods may be implemented on other types of servers (e.g., modular servers such as blade servers or rack servers) and any other type of information handling system (e.g., desktop computer, portable computer such as laptop computer, etc.). In the exemplary embodiment of FIG. 1, a chassis enclosure 103 (e.g., such as 2U, 3U or 4U rack unit chassis enclosure, computer tower enclosure, etc.) may be provided to enclose many of the components of system 100.

As shown in FIG. 1, information handling system 100 of this exemplary embodiment includes at least one host processing device 105, which may be a central processing unit CPU such as an Intel Xeon series processor, an Advanced Micro Devices (AMD) processor or one of many other suitable processing devices currently available. In this embodiment, CPU 105 may execute an operating system (OS) and/or virtualization layer for system 100. In this exemplary embodiment, CPU 105 is provided with an integrated memory controller (iMC) 107 to facilitate memory functions, although it will be understood that a memory controller may be alternatively provided as a separate chip or other circuit in other embodiments. System memory 115 may include main system memory 117 (e.g., volatile random access memory such as DRAM or other suitable form of random access memory), and nonvolatile memory (NVM) 119 (e.g., Flash, EEPROM or other suitable non-volatile memory) as shown. Memory controller 107 of CPU 105 may be coupled to access each of main system memory 117 and NVM 119 as shown to enable read and write memory operations by CPU 105. In this regard, memory controller 107 may be configured to perform tasks including, but not limited to, loading data or programs into system memory 115 and/or reading data or executing programs in memory 115. Examples of such data or programs include, but are not limited to, BIOS 206 and virtualization layer 202 illustrated in FIG. 2, system files, or any other suitable programs or data.

Still referring to the exemplary embodiment of FIG. 1, an optional display 125 (e.g., LCD display or other suitable display device) may be coupled to optional graphics processor 120 to provide visual images to the user, it being understood that host processing device may include integrated graphic capability that may be coupled directly to display 125 without graphics processor 120. Display controller 120 may in turn be coupled to processing device 105 via platform controller hub (PCH) 160 which may be present to facilitate input/output functions for the information handling system 100. Local system storage 135 (e.g., one or media drives such as hard disk drive/s, optical drives, NVRAM, Flash or any other suitable form of internal or external storage) may be coupled as shown to PCH 160 and its controller chip to provide permanent storage for the information handling system. Input devices such as a keyboard 145 and mouse/touchpad 147 may be optionally coupled to PCH 160 and its controller chip to enable the user to interact with the information handling system 100 and programs or other software/firmware executing thereon. An embedded Baseboard Management Controller (BMC) 180 running system firmware and an optional trusted platform module (TPM) 190 are each also shown coupled to PCH chip 160.

Also shown coupled to processing device 105 for this exemplary server embodiment is network interface card (NIC) 157 that may be optionally provided to enable wired and/or wireless communication across network 176 (e.g., such as the Internet or local corporate intranet) with various multiple information handling systems configured as network devices $178_1$-$178_n$. It will be understood that the particular configuration of FIG. 1 is exemplary only, and that an information handling system may be configured with fewer, additional or alternative components than those illustrated in FIG. 1. It will also be understood that in some embodiments any one or more of CPU 105, graphics processor 120, PCH 160, BMC 180, TPM 190, etc. may be implemented as separate chips/devices, where in other embodiments they may be integrated onto a common device/chip.

Figure 2:
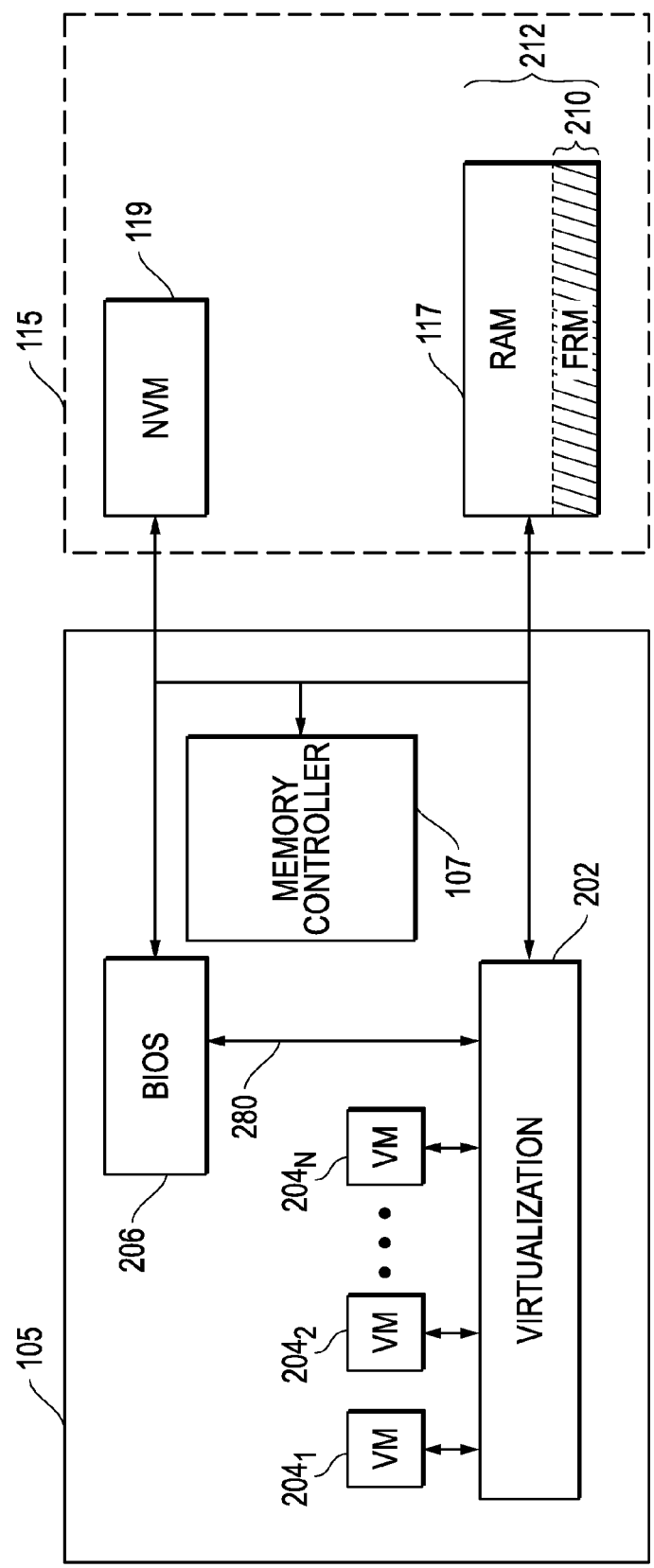
FIG. 2 illustrates a simplified block diagram of a host processing device and system memory according to one exemplary embodiment of the disclosed systems and methods.

FIG. 2 illustrates one exemplary embodiment in which host processing device 105 is coupled to system memory 115 and is executing a virtualization layer 202 and system BIOS 206, e.g., as part of information handling system 100 of FIG. 1. As shown, multiple virtual machines (VMs) $204_1$ to $204_N$ may be created and running on virtualization layer 202. Virtualization layer 202 may be, for example, a virtual machine monitor, hypervisor (e.g., bare metal hypervisor), Guest OS/Host OS, parent partition or any program, software or other logic component that is capable of creating one or more virtual machines $204_1$ to $204_N$ on a single information handling system 100 or single modular server component (e.g., individual server blade, individual server rack, etc.) of an information handling system. Examples of suitable virtualization layers include, but are not limited to, VMware Server and VMware ESX and ESXi (such as ESXi 5.5) available from VMware, Inc. of Palo Alto, Calif.; Microsoft Hyper-V available from Microsoft of Redmond, Wash.; Citrix Xen available from Citrix Systems, Inc. of Santa Clara, Calif.; Sun xVM available from Oracle Corporation of Redwood Shores, Calif., etc. Thus, as used herein, a virtualization layer may be a bare metal hypervisor, or may be an operating system (OS) that operates as a host for VMs or guests. Although FIGS. 2-5 are described in relation to an exemplary virtualization layer, it will be understood that in other embodiments, the disclosed systems and methods may be implemented using a host processing device that executes an operating system (e.g., such as Windows-based OS, Linux-based OS, etc.) without virtualization capability that otherwise is configured to perform the tasks described herein for virtualization layer 202.

In FIG. 2, each of virtual machines $204_1$ to $204_N$ may be, for example, capable of running different operating systems independent of one another. In one exemplary embodiment, virtualization layer 202 may also be capable of performing all the functions of a full-scale operating system in addition to its virtualization capabilities. Furthermore, each virtual machine 204 may view itself as a separate machine with its own resources though it may only be implemented as a machine by host processor 105 and may or may not be aware of any other virtual machines 204. Virtualization layer 202 may therefore exist as a layer of abstraction between virtual machines $204_1$ to $204_N$ and underlying hardware of information handling system 100, e.g., processor/s, memory, storage, etc. Further information on systems and methods of virtualization and/or interaction with system memory may be found, for example, in U.S. Pat. No. 8,151,138; U.S. Pat. No. 8,001,581; United States Patent Application Publication No. 2010/0146267; U.S. patent application Ser. No. 13/618,666; and U.S. patent application Ser. No. 13/955,423, each of which is incorporated herein by reference in its entirety for all purposes.

As shown in FIG. 2, system BIOS may communicate through memory controller 107 with non-volatile memory 119 to read and write information to non-volatile memory 119. Additionally, virtualization layer 202 may communicate with memory controller 107 to dynamically allocate and disperse main system memory 117 as needed to virtual machines $204_1$ to $204_N$. As illustrated in FIG. 2, a dynamically-variable protected reliable memory region 210 of the total available memory space 212 of main system memory 117 has been designated by BIOS 206 for use as FRM, e.g., to mirror memory channels in Socket 0 such that virtualization layer 202 may execute from the memory region 210 and continue running the virtualization layer (e.g., together with any other selected critical processes, programs and/or other data that) even when an uncorrectable error occurs to the memory that it utilizes. In this regard, mirrored reliable memory region 210 represents portion/s of main memory 117 containing information that is duplicated and also contained in other regions of main memory 117 outside mirrored memory region 210, whereas other non-mirrored regions of main memory 117 contain single copies of other non-mirrored information that is not duplicated within main system memory 117 (e.g., such as software programs executing on VMs $204_1$ to $204_N$, data associated with VMs $204_1$ to $204_N$, etc.). In one embodiment, the criticality of a process may be determined by an OS and/or virtualization layer which may tag each process and use that information for moving the process to and from the reliable memory region 210.

It will be understood that FIG. 2 shows reliable memory region 210 as a single continuous region for purposes of illustration only, and that it is also possible that protected reliable memory region 210 may be actually made up of two or more discontinuous separate mirrored portions of total available memory space 212 of main system memory 117. It will also be understood that it is possible in an alternative embodiment that an OS without virtualization capability that is executing on host processing device 105 may communicate with memory controller 107 and components of system memory 115 in similar manner as virtualization layer 202.

Memory controller 107 may implement protected reliable memory region 210 of FRM according to the designation of BIOS 206 by selectively allocating one or more given portions of main system memory 117 to be mirrored for FRM redundancy purposes. The relative size of protected reliable memory region 210 (shown in cross hatching in FIG. 2) as a portion of total available memory space 212 may thus be selectably varied to be greater or lesser according to memory designation from BIOS 206, e.g., during cold or warm system reboot between operating sessions. Memory controller 107 may also communicate the range of mirrored portions of memory 117 to virtualization layer 202 by reporting a parameter containing the exact memory addresses to be mirrored. Further exemplary information on memory controller memory mirroring operations may be found in U.S. Pat. No. 8,151,138, which has been incorporated herein by reference in its entirety for all purposes.

As further shown in FIG. 2, system BIOS may also exchange information regarding characteristics of mirrored FRM memory (e.g., mirrored memory size, mirrored memory addresses, etc.) with virtualization layer 202 across a suitable communication interface 280, e.g., such as Advanced Configuration and Power Interface (ACPI) specification (e.g., by modifying information contained in an ACPI table maintained in non-volatile memory 119), Int15 function E820, EFI Memory Map, etc. Virtualization layer 202 may thus be made aware across interface 280 of the mirrored memory addresses from which layer 202 is running.

Figure 3:
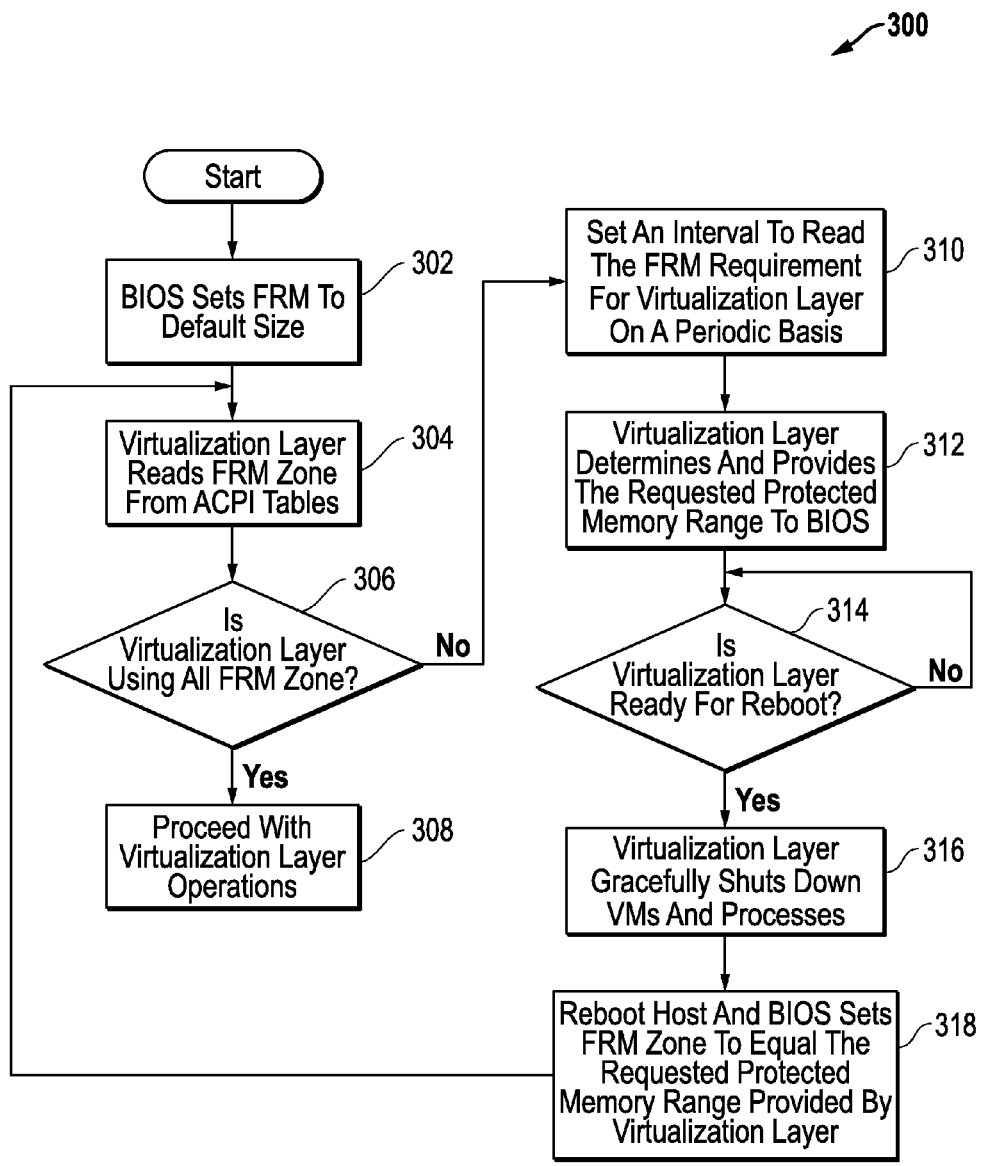
FIG. 3 illustrates methodology according to one exemplary embodiment of the disclosed systems and methods.
Figure 4:
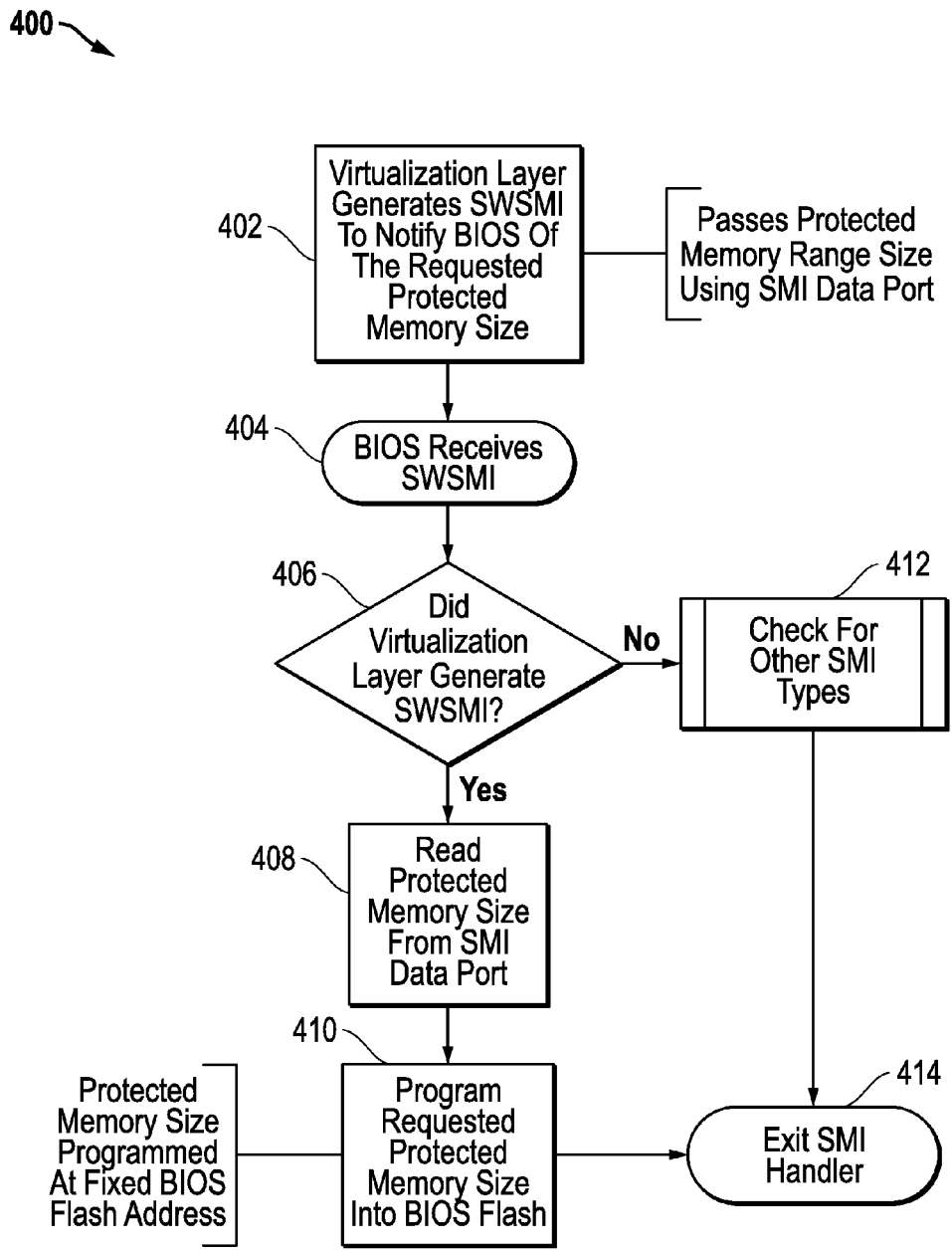
FIG. 4 illustrates methodology according to one exemplary embodiment of the disclosed systems and methods.
Figure 5:
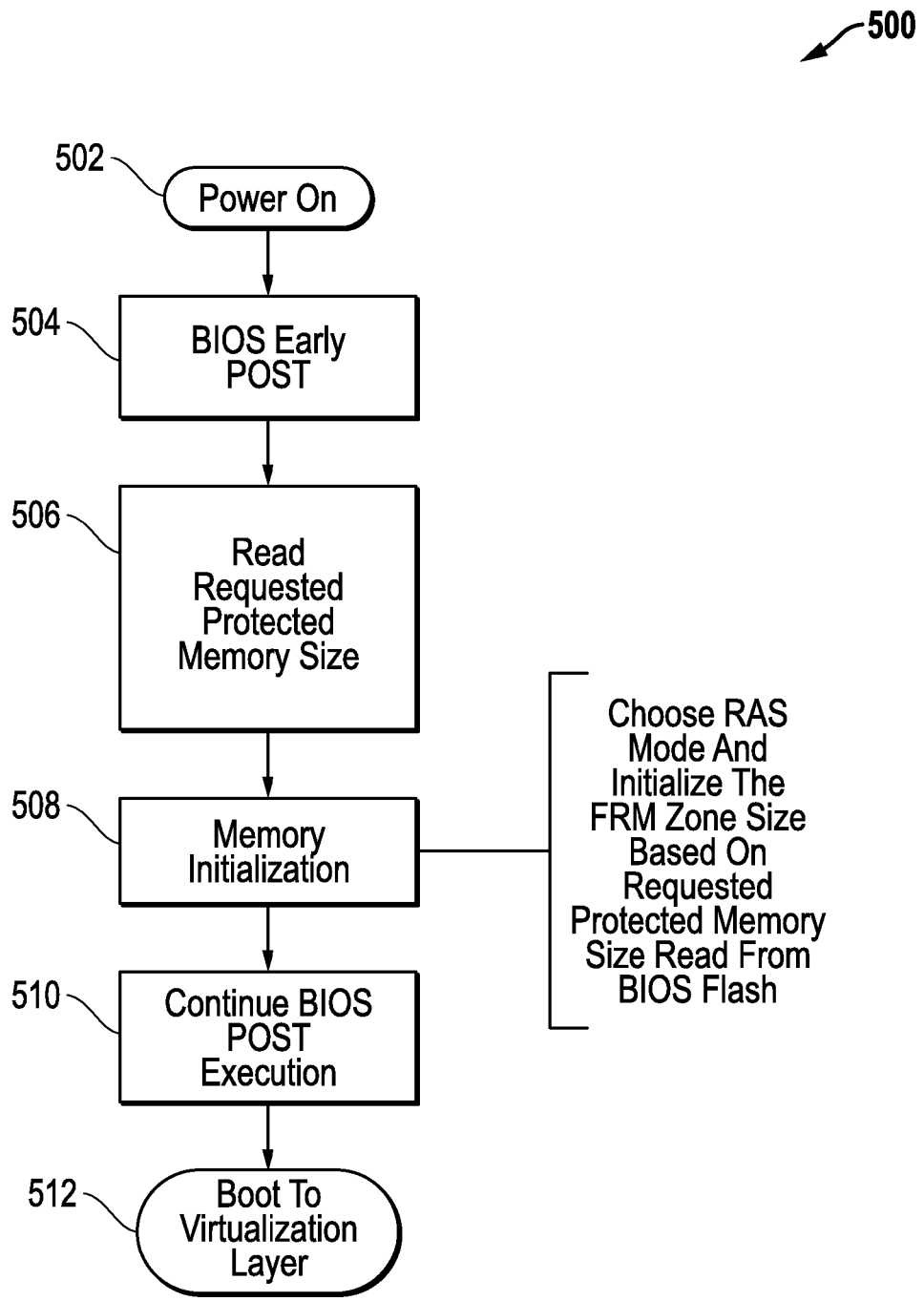
FIG. 5 illustrates methodology according to one exemplary embodiment of the disclosed systems and methods.

FIGS. 3-5 illustrate exemplary embodiments of methodologies that may be employed to initially set, and then dynamically adjust, the size of FRM protected reliable memory region 210 of information handling system 100. Although for purposes of illustration the exemplary methodologies of FIGS. 3-5 are described below in relation to the exemplary configuration of information handling system 100 of FIGS. 1 and 2, it will be understood that the disclosed systems and methods may be implemented to dynamically allocate FRM for other configurations of information handling system and random access memory configurations.

FIG. 3 illustrates one embodiment of methodology 300 as it may be employed to initially set, and then adjust, the size of mirrored FRM protected reliable memory region 210 of information handling system 100, or any other random access memory and information handling system configuration. As shown, methodology 300 starts in step 302 where system BIOS 206 initially sets the mirrored FRM protected reliable memory region 210 to a default size, e.g., one-fourth of the total available memory 212 of main system memory 117 to be mirrored. Step 302 may be performed, for example, by BIOS 206 during power-on self-test (POST), and a given default FRM protected reliable memory region size may be stored in NVM 119 and then read by BIOS 206 from NVM 119 during system boot of information handling system 100 to a first operating session.

After system boot up, virtualization layer 202 may be loaded into mirrored FRM region 210 by system BIOS or any other operating system loader or device. Virtualization layer 202 may determine in step 304 the size and memory range of the current set (default) FRM protected reliable memory region 210 using any suitable technique. For example, virtualization layer 202 may read information representing the size and address ranges of mirrored FRM protected reliable memory region 210 reported by BIOS 206 across interface 280. Virtualization layer 202 may respond to this information from BIOS 206 by starting and running its vmkernel and any one or more selected (e.g., critical) processes or other programs or data in mirrored region 210 during the first operating session such that virtualization layer 202 may be protected against memory failure since it is running with other selected processes/programs/data in mirrored portions of memory 117. In this regard, the virtualization layer 202 may be configured in one exemplary embodiment to select and direct which other data or programs, if any, should be read into the mirrored FRM region 210. Possible examples of such data and programs may include, but are not limited to, system configurations, device information, VM's, and VM configurations, etc. It is alternatively or additionally possible that selection of particular programs, processes and/or data to read into mirrored RFM region 210 may be made in any other suitable manner, e.g., by other logic executing on host processing device 105, by direct selection of programs, processes and/or data by an information handling system user, by logic executing on other processing devices, etc.

Next, in step 306, virtualization layer 202 may calculate the actual memory size required to run its virtualization layer and other processes/programs/data selected for memory mirroring, and then if this actual required memory size utilizes all of the current default FRM protected reliable memory region 210. If so, then methodology 300 may proceed to step 308 where virtualization layer 202 proceeds with normal virtualization layer operations, e.g., including creating and running VMs $204_1$ to $204_N$. However, if virtualization layer determines in step 306 that the calculated actual required memory size does not use all of the current default FRM protected reliable memory region 210, then methodology 300 proceeds to optional step 310. In optional step 310, virtualization layer 202 may optionally set a recalculation time interval (or retrieve a stored pre-defined recalculation time interval) for re-calculating a current actual memory size required to run its virtualization layer and other processes/programs/data selected for memory mirroring. Virtualization layer may then re-calculate the actual memory size required to run its virtualization layer and other processes/programs/data selected for memory mirroring at least once more after passage of this recalculation time interval. This optional re-calculation process may be repeated for as many time as desired between passage of recalculation time intervals before methodology 300 proceeds to step 312.

In step 312, virtualization layer 202 may then determine a requested protected reliable memory size value based at least in part on the values of actual memory size calculated in steps 306 and 310 that is required to run its Virtualization layer kernel and other processes/programs/data selected for memory mirroring, and provides this determined requested protected reliable memory size value to system BIOS 206 via communication interface 280. BIOS 206 may then store the requested protected reliable memory size value in NVM 119 for later retrieval as described further herein. At this time, BIOS 206 may also set a FRM memory allocation flag in NVM 119 that will be accessed and recognized by system BIOS 206 at the next system boot to cause BIOS 206 to set the new requested protected reliable memory size value in system memory 117 during the next boot.

In step 312, virtualization layer 202 may determine the requested protected reliable memory size value based at least in part on the last actual mirrored memory size value calculated in step 310 (or step 306 where optional step 310 is not employed), an average of the actual mirrored memory size values calculated in steps 310 and 306, etc. For example, the requested protected reliable memory size value may be set to be equal to the calculated required actual memory size (or average of such values) or may be set to be equal to the calculated required actual memory size (or average of such values) plus an additional buffer value. Thus, the requested protected reliable memory size value may be set to any value that is greater than or equal to the calculated required actual memory size value (or average of such values). For example, in one exemplary embodiment, a requested protected reliable memory size value may be set to be equal to the same size as the actual required mirrored memory size up to about three times the size of the actual required mirrored memory size, alternatively from about one and half times the actual required mirrored memory size up to about two and half times the size of the actual required mirrored memory size, and further alternatively may be equal to about twice the actual required mirrored memory size, it being understood that the requested protected reliable memory size value may alternatively be set to be any value greater than three times the size of the actual required mirrored memory size.

Next, methodology 300 continues at step 314 until virtualization layer 202 is ready for system reboot. In one optional embodiment, a user of information handling system 100 may be automatically notified in step 314 (e.g., via optional message displayed on display 125 of information handling system 100) that system reboot is needed in order to reset the size of mirrored FRM protected reliable memory region 210 to optimize memory efficiency. In this optional case, the user may respond by entering a command to reboot the system. In any case, when virtualization layer 202 is next ready to reboot, methodology 300 proceeds to step 316 where virtualization layer gracefully shuts down VMs 204₁ to 204_N and any other active processes and then gracefully shuts itself down. Methodology 300 then proceeds to step 318 where the host processing device 105 is rebooted to a second and subsequent operating session, and BIOS 206 reads the requested protected reliable memory size value from NVM 119 that was stored in step 312 and sets the mirrored FRM protected reliable memory region 210 to equal this new requested protected reliable memory size for use during the second operating session, and methodology 300 returns to step 304 as shown. It will be understood that in an alternate embodiment, it may be possible that BIOS 206 may be configured to dynamically adjust the size of mirrored FRM protected reliable memory region 210 to the new requested protected reliable memory size of step 312 in real time without rebooting where main system memory 117 is configured to allow real time mirrored memory adjustment.

FIG. 4 illustrates one exemplary embodiment of a methodology 400 that may be performed by virtualization layer 202 to notify BIOS 206 of a determined requested protected reliable memory size for mirrored FRM protected reliable memory region 210 of information handling system 100, and by BIOS 206 to program the requested protected reliable memory size into NVM 119 (e.g., after determining the requested protected reliable memory size in step 312 of FIG. 3). As shown, methodology 400 starts in step 402 where virtualization layer 202 may generate a software system management interrupt (SWSMI) to notify BIOS 206 of a determined requested protected reliable memory size, e.g., communicating the range size of the determined requested protected reliable memory to BIOS 206 using a system management interrupt (SMI) data port.

In step 404 of FIG. 4, BIOS 206 receives BIOS SWSMI communications, and in step 406 a SMI handler of BIOS 206 makes a determination in step 406 as to whether the currently received BIOS SWSMI communication was generated by virtualization layer 202. If not, then methodology 400 proceeds to step 412 where the BIOS SMI handler checks for another type of SMI, and then exits in step 414. However, if it is determined in step 406 that the currently received BIOS SWSMI communication was generated by virtualization layer 202, then BIOS 206 may be configured to be aware that the current SWSMI contains a requested protected reliable memory size value for FRM. In this case, methodology 400 proceeds to step 408 where the requested protected reliable memory size is read by BIOS SMI handler from the SMI data port. Then in step 410, the requested protected reliable memory size value is programmed or otherwise written to NVM memory 119 (e.g., BIOS flash memory) by the BIOS SMI handler which then exits in step 414.

FIG. 5 illustrates one exemplary embodiment of a methodology 500 that may be performed by BIOS 206 on system reboot to set the mirrored FRM protected reliable memory region 210 to equal the new requested protected reliable memory size value, e.g., such as in step 318 of methodology 300 of FIG. 3. As shown, methodology 500 starts in step 502 with system power up after a previous system shut-down or restart operation. Methodology 500 then proceeds to step 504 where BIOS 206 performs early POST, and then to step 506 where BIOS 206 reads the stored requested protected reliable memory size value that was last determined and requested by virtualization layer 202, e.g., in step 312 of methodology 300 of FIG. 3. Then BIOS 206 may proceed to step 508 where memory 117 is initialized by choosing an appropriate reliability, availability, and serviceability (RAS) redundant memory mode (e.g., memory mirroring mode) and initializing the mirrored FRM protected reliable memory region 210 based on the protected memory size value last requested by virtualization layer 202 and read by BIOS 206 from NVM 119. Methodology 500 then proceeds to step 510 by continuing BIOS POST execution, and terminates in step 512 by booting to virtualization layer 202.

It will be understood that the combination and particular order of steps described and illustrated in each of FIGS. 3-5 is exemplary only, and that any other combination of fewer, additional, and/or alternative steps may be employed that is suitable for implementing and/or enabling allocation of FRM reliable memory based at least in part on a determined size of protected reliable memory region that is actually required for the FRM.

It will also be understood that one or more of the tasks, functions, or methodologies described herein (e.g., including those performed by an OS or virtualization layer 202 and BIOS 206) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    volatile system memory, the volatile system memory having a total available memory space; and
    at least one host processing device coupled to access the total memory space of the volatile system memory, the processing device being configured to execute a system basic input/output system (BIOS) to dynamically allocate a variable portion of the total memory space of the volatile system memory as a protected reliable memory region to mirror one or more other portions of the total memory space, and to execute a virtualization layer or operating system (OS) from the mirrored portions of the protected reliable memory region;
    where the processing device is further configured to:
        execute the system BIOS to set the size of the protected reliable memory region to equal a first protected reliable memory size value for use during a first booted operating session;
        then execute the virtualization layer or OS using the first protected reliable memory size value during the first booted operating session to determine a second and different size of protected reliable memory region based at least in part on a value of actual memory size used to execute at least the virtualization layer or OS during the first booted operating session, and to provide the determined second size of protected reliable protected memory as a requested protected reliable memory size value to the system BIOS, and
        then execute the system BIOS during the next system reboot operation to reallocate the size of the protected reliable memory region to equal the requested second protected reliable memory size value received from the virtualization layer or OS.

2. The information handling system of claim 1, further comprising non-volatile memory coupled to the host processing device; and where the host processing device is further configured to execute the system BIOS to:
    store the received requested second protected reliable memory size value in the non-volatile memory before the next booted operating session;
    then read the stored requested second protected reliable memory size value from the non-volatile memory at the occurrence of a next system reboot operation; and
    then reallocate the size of the protected reliable memory region for use during the next booted operating session to equal the requested second protected reliable memory size value received from the virtualization layer or OS.

3. The information handling system of claim 1, further comprising non-volatile memory coupled to the host processing device; and where the host processing device is further configured to execute the virtualization layer or OS to calculate a value of memory size actually used to execute at least the virtualization layer or OS during the first operating session and then determine a size of the second protected reliable memory region based at least in part on the calculated value of actual memory size used to execute at least the virtualization layer or OS during the first operating session of the virtualization layer or OS, and to provide the second determined size of protected reliable protected memory as a requested second protected reliable memory size value to the system BIOS during the first operating session of the virtualization layer or OS; and where the host processing device is further configured to execute the system BIOS to:
    store the received requested second protected reliable memory size value in the non-volatile memory during the first operating session;
    then read the stored requested second protected reliable memory size value from the non-volatile memory during at the occurrence of the next system reboot for a second operating session; and
    then reallocate the size of the protected reliable memory region to equal the requested second protected reliable memory size value received from the virtualization layer or OS for use in the second operating session.

4. The information handling system of claim 1, further comprising non-volatile memory coupled to the host processing device; and where the host processing device is further configured to execute the virtualization layer or OS to calculate a value of memory size actually used to execute at least the virtualization layer or OS during the first operating session and then determine the second size of protected reliable memory region based at least in part on the calculated value of actual memory size used to execute at least the virtualization layer or OS during the first operating session of the virtualization layer or OS, and to write the determined second size of protected reliable protected memory as a requested second protected reliable memory size value to an Advanced Configuration and Power Interface (ACPI) table maintained in the non-volatile memory during the first operating session of the virtualization layer or OS; and where the host processing device is further configured to execute the system BIOS to:
    read the stored requested second protected reliable memory size value from the ACPI table maintained in the non-volatile memory during the occurrence of a next system reboot for a second operating session; and
    then reallocate the size of the protected second reliable memory region to equal the requested protected reliable memory size value read from the ACPI table for use in the second operating session.

5. The information handling system of claim 1, where the host processing device is further configured to execute the virtualization layer or OS together with one or more other selected programs, processes or data from the mirrored portions of the protected reliable memory region; calculate a value of memory size actually used to execute at least the virtualization layer or OS during the first operating session; and then to execute the virtualization layer or OS to determine the second size of the protected reliable memory region based at least in part on the calculated value of actual memory size used to execute the virtualization layer or OS in combination with the one or more other selected programs, processes or data.

6. The information handling system of claim 1, where the host processing device is further configured to execute the virtualization layer or OS to create and run one or more virtual machines (VMs); and to execute one or more software programs on the VMs from non-mirrored portions of the volatile system memory that exist outside the protected reliable memory region.

7. The information handling system of claim 1, where the host processing device is further configured to execute the virtualization layer or OS to set a recalculation time interval and to recalculate at least one different value of memory size actually used to execute at least the virtualization layer or OS during the first operating session after passage of the recalculation time interval; and then to determine the second size of protected reliable memory region based at least in part on the calculated multiple values of actual memory size prior to providing the determined second size of protected reliable protected memory as a requested second protected reliable memory size value to the system BIOS.

8. The information handling system of claim 1, where the host processing device is configured to together execute the system BIOS and virtualization layer or OS in communication with each other across a communication interface to allow the virtualization layer or OS to provide the requested second protected reliable memory size value to the system BIOS across the communication interface.

9. The information handling system of claim 1, where the virtualization layer or OS is a hypervisor layer; and where the actual memory size used to execute at least the virtualization layer or OS comprises the memory size required to execute a kernel of the hypervisor.

10. The system of claim 1, where the processing device is further configured to execute the virtualization layer or OS to provide the determined second size of protected reliable protected memory as a requested protected reliable memory size value by software system management interrupt (SWSMI) to the system BIOS during the first operating session of the virtualization layer or OS.

11. The system of claim 1, where the processing device is further configured to:
    execute the system BIOS to set the size of the protected reliable memory region to equal a default protected reliable memory size value for use during the first booted operating session;
    execute the virtualization layer or OS using the default protected reliable memory size value during the first booted operating session to:
        determine the current size of the existing default protected reliable memory region;
        calculate a value of memory size actually used to execute at least the virtualization layer or OS during the first operating session; and
    then execute the virtualization layer or OS to determine if the calculated memory size actually used to execute at least the virtualization layer or OS utilizes all of the default protected reliable memory size value and one of:
        proceed with creating and running one or more virtual machines during the first booted operating session if the calculated memory size utilizes all of the default protected reliable memory size value, or
        determine the second and different size of protected reliable memory and provide the determined second size of protected reliable protected memory as the requested protected reliable memory size value to the system BIOS if the calculated memory size does not utilize all of the default protected reliable memory size value.

12. The system of claim 11, where the processing device is further configured to execute the virtualization layer or OS to determine the current size of the existing default protected reliable memory region by reading information reported by the system BIOS.

13. An information handling system, comprising:
    volatile system memory, the volatile system memory having a total available memory space; and
    at least one host processing device coupled to access the total memory space of the volatile system memory, the processing device being configured to execute a system basic input/output system (BIOS) to allocate a variable portion of the total memory space of the volatile system memory as a protected reliable memory region to mirror one or more other portions of the total memory space, and to execute a virtualization layer or operating system (OS) from the mirrored portions of the protected reliable memory region;
    where the processing device is further configured to:
        execute the virtualization layer or OS to calculate a value of memory size actually used to execute at least the virtualization layer or OS during the first operating session and then determine a size of protected reliable memory region based at least in part on the calculated actual memory size required to execute at least the virtualization layer or OS, and to provide the determined size of protected reliable protected memory as a requested protected reliable memory size value to the system BIOS, and
        execute the system BIOS to set the size of the protected reliable memory region to equal the requested protected reliable memory size value received from the virtualization layer or OS; and
    where the system further comprises non-volatile memory coupled to the host processing device; and where the host processing device is further configured to execute the virtualization layer or OS to determine a size of protected reliable memory region based at least in part on a value of actual memory size required to execute at least the virtualization layer or OS during a first operating session of the virtualization layer or OS, and to provide the determined size of protected reliable protected memory as a requested protected reliable memory size value by software system management interrupt (SWSMI) to the system BIOS during the first operating session of the virtualization layer or OS; and where the host processing device is further configured to execute the system BIOS to:

store the received requested protected reliable memory size value at a fixed address in the non-volatile memory and set a fault resistant memory (FRM) memory allocation flag in the non-volatile memory during the first operating session, then recognize the FRM memory allocation flag in the non-volatile memory during the occurrence of a next system reboot for a second operating session, and then respond to the recognized presence of the FRM memory allocation flag in the non-volatile memory by reading the stored requested protected reliable memory size value from fixed address in the non-volatile memory, and setting the size of the protected reliable memory region to equal the requested protected reliable memory size value read from the fixed address in the non-volatile memory for use in the second operating session.

14. A method of allocating fault resistant memory within a total available volatile memory space that is coupled to at least one host processing device of an information handling system, the method comprising using the at least one host processing device to:

implement a system basic input/output system (BIOS) to access and dynamically allocate a variable portion of the total memory space of the volatile system memory as a protected reliable memory region to mirror one or more other portions of the total memory space;

execute the system BIOS to set the size of the protected reliable memory region to equal a first protected reliable memory size value for use during a first booted operating session;

then implement a virtualization layer or operating system (OS) using the first protected reliable memory size value during the first booted operating session from the mirrored portions of the protected reliable memory region;

cause the virtualization layer or OS to determine a second and different size of protected reliable memory region based at least in part on a value of actual memory size used to implement the at least the virtualization layer or OS during the first booted operating session, and to provide the determined second size of protected reliable protected memory as a requested second protected reliable memory size value to the system BIOS; and then cause the system BIOS to reallocate the size of the protected reliable memory region during the next system reboot operation to equal the requested second protected reliable memory size value received from the virtualization layer or OS.

15. The method of claim 14, where the information handling system includes non-volatile memory coupled to the host processing device; and where the method further comprises using the host processing device to cause the system BIOS to:

store the received requested second protected reliable memory size value in the non-volatile memory before the next booted operating session;

then read the stored requested second protected reliable memory size value from the non-volatile memory at the occurrence of a next system reboot operation; and then reallocate the size of the protected reliable memory region for use during the next booted operating session to equal the requested second protected reliable memory size value received from the virtualization layer or OS.

16. The method of claim 14, where the information handling system includes non-volatile memory coupled to the host processing device; and where the method further comprises using the host processing device to cause the virtualization layer or OS to calculate a value of memory size actually used to execute at least the virtualization layer or OS during the first operating session and then determine a size of the second protected reliable memory region based at least in part on the calculated value of actual memory size used to execute at least the virtualization layer or OS during the first operating session of the virtualization layer or OS, and to provide the second determined size of protected reliable protected memory as a requested second protected reliable memory size value to the system BIOS during the first operating session of the virtualization layer or OS; and where the host processing device is further configured to cause the system BIOS to:

store the received requested second protected reliable memory size value in the non-volatile memory during the first operating session;

then read the stored requested second protected reliable memory size value from the non-volatile memory during at the occurrence of the next system reboot for a second operating session; and then reallocate the size of the protected reliable memory region to equal the second requested protected reliable memory size value received from the virtualization layer or OS for use in the second operating session.

17. The method of claim 14, where the information handling system includes non-volatile memory coupled to the host processing device; and where the method further comprises using the host processing device to cause the virtualization layer or OS to calculate a value of memory size actually used to execute at least the virtualization layer or OS during the first operating session and then determine the second size of protected reliable memory region based at least in part on the calculated value of actual memory size used to execute at least the virtualization layer or OS during the first operating session of the virtualization layer or OS, and to write the determined second size of protected reliable protected memory as a requested second protected reliable memory size value to an Advanced Configuration and Power Interface (ACPI) table maintained in the non-volatile memory during the first operating session of the virtualization layer or OS; and where the host processing device is further configured to cause the system BIOS to:

read the stored requested second protected reliable memory size value from the ACPI table maintained in the non-volatile memory during the occurrence of a next system reboot for a second operating session; and then reallocate the size of the protected second reliable memory region to equal the requested protected reliable memory size value read from the ACPI table for use in the second operating session.

18. The method of claim 14, further comprising using the host processing device to implement the virtualization layer or OS together with one or more other selected programs, processes or data from the mirrored portions of the protected reliable memory region; calculate a value of memory size actually used to execute at least the virtualization layer or OS during the first operating session; and then to cause the virtualization layer or OS to determine the second size of the protected reliable memory region based at least in part on the calculated value of actual memory size used to execute the virtualization layer or OS in combination with the one or more other selected programs, processes or data.

19. The method of claim 14, further comprising using the host processing device to implement the virtualization layer or OS to create and run one or more virtual machines (VMs); and to execute one or more software programs on the VMs from non-mirrored portions of the volatile system memory that exist outside the protected reliable memory region.

20. The method of claim 14, further comprising using the host processing device to implement the virtualization layer or OS to set a recalculation time interval and to recalculate at least one different value of memory size actually used to execute at least the virtualization layer or OS during the first operating session after passage of the recalculation time interval; and then to determine the second size of protected reliable memory region based at least in part on the calculated multiple values of actual memory size prior to providing the determined second size of protected reliable protected memory as a requested second protected reliable memory size value to the system BIOS.

21. The method of claim 14, further comprising using the host processing device to implement the system BIOS and virtualization layer or OS in communication with each other across a communication interface to allow the virtualization layer or OS to provide the requested second protected reliable memory size value to the system BIOS across the communication interface.

22. The method of claim 14, where the virtualization layer or OS is a hypervisor layer; and where the actual memory size required to execute at least the virtualization layer or OS comprises the memory size used to execute a kernel of the hypervisor.

23. The method of claim 14, further comprising using the at least one host processing device to cause the virtualization layer or OS to provide the determined second size of protected reliable protected memory as a requested protected reliable memory size value by software system management interrupt (SWSMI) to the system BIOS during the first operating session of the virtualization layer or OS.

24. The method of claim 14, further comprising using the at least one host processing device to:
execute the system BIOS to set the size of the protected reliable memory region to equal a default protected reliable memory size value for use during the first booted operating session;
execute the virtualization layer or OS using the default protected reliable memory size value during the first booted operating session to:
determine the current size of the existing default protected reliable memory region;
calculate a value of memory size actually used to execute at least the virtualization layer or OS during the first operating session; and
then execute the virtualization layer or OS to determine if the calculated memory size actually used to execute at least the virtualization layer or OS utilizes all of the default protected reliable memory size value and one of:
proceed with creating and running one or more virtual machines during the first booted operating session if the calculated memory size utilizes all of the default protected reliable memory size value, or
determine the second and different size of protected reliable memory and provide the determined second size of protected reliable protected memory as the requested protected reliable memory size value to the system BIOS if the calculated memory size does not utilize all of the default protected reliable memory size value.

25. The method of claim 24, further comprising using the at least one host processing device to execute the virtualization layer or OS to determine the current size of the existing default protected reliable memory region by reading information reported by the system BIOS.

26. A method of allocating fault resistant memory within a total available volatile memory space that is coupled to at least one host processing device of an information handling system, the method comprising using the at least one host processing device to:
implement a system basic input/output system (BIOS) to access and allocate a variable portion of the total memory space of the volatile system memory as a protected reliable memory region to mirror one or more other portions of the total memory space;
implement a virtualization layer or operating system (OS) from the mirrored portions of the protected reliable memory region;
cause the virtualization layer or OS to determine a size of protected reliable memory region based at least in part on a value of actual memory size required to implement the at least the virtualization layer or OS, and to provide the determined size of protected reliable protected memory as a requested protected reliable memory size value to the system BIOS; and
cause the system BIOS to set the size of the protected reliable memory region to equal the requested protected reliable memory size value received from the virtualization layer or OS;
where the information handling system includes non-volatile memory coupled to the host processing device; and where the method further comprises using the host processing device to cause the virtualization layer or OS to determine a size of protected reliable memory region based at least in part on a value of actual memory size required to execute at least the virtualization layer or OS during a first operating session of the virtualization layer or OS, and to provide the determined size of protected reliable protected memory as a requested protected reliable memory size value by software system management interrupt (SWSMI) to the system BIOS during the first operating session of the virtualization layer or OS; and where the host processing device is further configured to cause the system BIOS to:
store the received requested protected reliable memory size value at a fixed address in the non-volatile memory and set a fault resistant memory (FRM) memory allocation flag in the non-volatile memory during the first operating session,
then recognize the FRM memory allocation flag in the non-volatile memory during the occurrence of a next system reboot for a second operating session, and
then respond to the recognized presence of the FRM memory allocation flag in the non-volatile memory by reading the stored requested protected reliable memory size value from fixed address in the non-volatile memory, and setting the size of the protected reliable memory region to equal the requested protected reliable memory size value read from the fixed address in the non-volatile memory for use in the second operating session.

* * * * *